May 19, 1925.
A. SPINNER ET AL
SANITARY CIGAR CUTTER
Filed Aug. 14, 1922
1,538,522
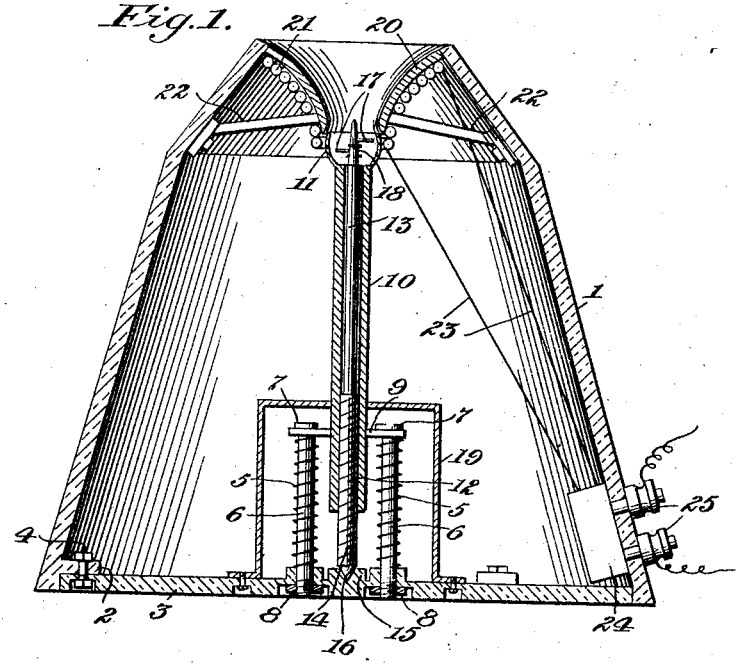
Fig.1.
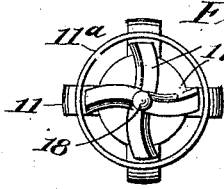
Fig.2.
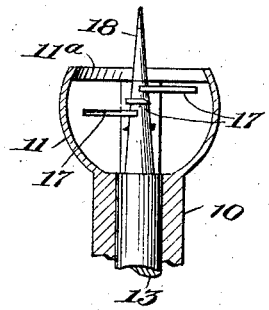
Inventors:
Abraham Spinner
and John S. Morenna,
by Wolfe + Moss
Att'ys.

Patented May 19, 1925.

1,538,522

UNITED STATES PATENT OFFICE.

ABRAHAM SPINNER AND JOHN S. MERENNA, OF BROOKLYN, NEW YORK.

SANITARY CIGAR CUTTER.

Application filed August 14, 1922. Serial No. 581,868.

*To all whom it may concern:*

Be it known that we, ABRAHAM SPINNER and JOHN S. MERENNA, citizens of the United States, and residents of Brooklyn, in the county of Kings and State of New York, have made and invented certain new and useful Improvements in Sanitary Cigar Cutters, of which the following is a specification.

This invention relates to sanitary cigar cutters and perforators; that is, sterile devices for perforating and cutting off the tips of cigars, preparatory to smoking them.

An object of our invention is to provide a device of the kind described which will be self-sterilizing and therefor sanitary and aseptic, even though a previous user of the device may have moistened the end of his cigar in his mouth before using the cutter and may have thus contaminated the various parts of the device with which the thus contaminated cigar may come into contact; and more specifically to provide a heating means, such as an electric resistance coil, whereby all parts of the cutting device with which the end of the cigar may come in contact are heated to such a temperature that they will be made sterile. In other words, any germs which may infect that part of the cutting device with which the cigar end may come in contact are destroyed within a very short period of time.

Another object of our invention is the provision of a device which will perforate the cigar end and cut off the tip thereof by a mere slight pressure on the cigar after the tip thereof has been applied thereto.

A great variety of cigar cutters and cigar perforators have been in use and our invention is applicable to almost any type thereof, but for purposes of description and illustration we will describe it as applied to the specific embodiment of cutter described below and illustrated in the drawings.

Referring to the accompanying drawings:—

Figure 1 is a vertical section of our improved device;

Fig. 2 is an enlarged plan view of the cutting knives; and

Fig. 3 is an enlarged elevation of the perforator and cutting knives.

Our device comprises a casing 1 of porcelain or other suitable material, slightly inset from the bottom of which are perforated lugs 2. A removable bottom plate 3, having perforations therein to register with the perforations in the lugs 2, is removably fastened to the casing by means of bolts or screws 4.

The casing is so shaped that the opening for the cigar at the top thereof is substantially as wide as the top, in order that the cigar may not come in contact with parts which are not maintained sterile by my novel means.

The cutting and perforating mechanism is mounted on the bottom plate and is removable therewith; it comprises two or more rods 5, surrounded by compression springs 6 retained between the ends thereof by any suitable means, such as heads 7 and 8; the lower heads 8 being suitably fastened to the bottom plate 3.

Brackets 9 are located between the heads 7 and the tops of the springs 6 and surround the rods 5, whereby they are held at the highest possible position by means of said springs. These brackets are fastened to a sleeve 10 which is flared out at its upper end into a number of curved narrow arms 11, connected together at their upper ends by an annular plate 11ª. The interior bore of the sleeve is threaded as at 12, there being a substantial distance between the bottom of this sleeve and the bottom plate to permit of a downward movement of the sleeve from the position shown on Fig. 1. A rod 13 is rotatable within the sleeve 10 and is provided with threads 14 exteriorly thereof which correspond with the threads within the bore of the sleeve 10. These threads are of such a pitch that downward movement of the sleeve will cause a suitably rapid rotation of the knives. A plate 15 is integral with or suitably fastened to the bottom plate 3 and has an indentation therein to provide a bearing for the pointed lower end 16 of the rod 13. Knife blades 17, as well as the cigar perforating point 18, are suitably fastened to the top of the rod or shaft 13 and revolve therewith, the blades being located within the space formed by the curved arms 11.

It will now be apparent that pressure caused by pressing the end of a cigar upon the arms 11 or the annular band connecting them together will cause them and thereby the sleeve 10 to move downwardly against the pressure of the springs 6; and such downward movement of the sleeve, by reason of the intermeshing threads within the bore of the sleeve and upon the exterior of the rod 13, will cause the rod and thereby the knife blades 17 and the perforator 18 to revolve, whereby the tip of the cigar will be perforated and cut off.

A suitable housing 19 may be provided around the mechanism to deflect the cigar clippings and prevent them from clogging the mechanism.

The opening into which the cigar end is inserted is flared outwardly as illustrated at 20 and is very little larger than the largest size of cigar commonly used, so that the device may accommodate any size of cigar. The flared part 20 consists of suitable heat conducting and heat resisting material, for example metal, so that it may be heated without damage thereto by the electric resistance coils 21 encircling and insulated from the same and also encircling the other parts of the device with which the cigar end may come in contact, and imparting a sterilizing temperature thereto.

The flared mouth piece 20 is suitably supported by brackets 22, and the coil 21 is supplied with electric current by means of the lead wires 23 connected to the transformer 24. Binding posts 25 on the exterior of the casing are connected to the transformer and receive current from any suitable source. The transformer may, obviously, be omitted, if suitable current, not requiring it, is available.

Our device is intended for use on cigar counters, and the current is permitted to flow therethrough continuously whereby all such parts of the device with which the end of the cigar may come in contact are kept constantly at such a temperature that they are always sterile, except possibly for a few moments after use, but they become sterile before the next cigar is inserted to be cut.

All that is necessary to perforate and cut a cigar hygienically is to insert the cigar end into the opening 20 and to exert a slight pressure thereon. This pressure is transmitted to the parts 11ª and 11, and therethrough to the sleeve 10, which, as described above, causes a rotation of the shaft 13 and the knives 17 and perforator 18. Upon withdrawing the cigar from the device the springs 6 cause an upward movement of the sleeve 10 and a counter rotation of the rotatable parts.

Having described our invention, what we desire to secure by Letters Patent of the United States is:

1. A cigar cutter comprising a casing having an opening therein, perforating and cutting means and means to sterilize such means.

2. A cigar cutter comprising a casing having one of its sides substantially wholly open, cutting means and means to sterilize said cutting means.

3. A cigar cutter comprising a casing having flared walls in one side thereof, substantially the whole of said side being occupied by said walls, cutting means adjacent said flared walls and means to keep sterile the cutting means and said flared walls.

4. A cigar cutter comprising a casing having an opening therein, curved walls extending from the edge of said opening and converging inwardly and downwardly of heat conducting and heat resisting material, cutting means at the lower end of the converging walls, an electric heat producing coil wound about said walls and the cutting mechanism and means to conduct electricity to said coil.

5. A cigar cutter comprising rotatable blades, a screw threaded shaft on which said blades are mounted, depressible means having screw threads therein to register with the screw threads on said shaft, whereby depression of the depressible means causes rotation of said blades.

6. A cigar cutter comprising rotatable blades, a screw threaded shaft on which said blades are mounted, depressible means having screw threads therein to register with the screw threads on said shaft, whereby depression of the depressible means causes rotation of said blades, and spring means acting on the depressible means to return it to depressible position.

7. A cigar cutter comprising a casing having an opening therein, curved walls extending from the edge of said opening and converging inwardly and downwardly of heat conducting and heat resisting material, a rotatable shaft, knife blades at the upper end of said shaft and at the lower end of the converging walls, screw threads on the lower end of said shaft, a bearing within the casing for said shaft, a sleeve having screw threads registering with the screw threads on said shaft, arms on said sleeve, pins passing through said arms, and springs on said pins.

8. A cigar cutter comprising a casing having an opening therein, curved walls extending from the edge of said opening and converging inwardly and downwardly of heat conducting and heat resisting material, a rotatable shaft, knife blades at the upper end of said shaft and at the lower end of the converging walls, screw threads on the lower end of said shaft, a bearing within the casing for said shaft, a sleeve having screw threads registering with the screw threads on said shaft, arms on said sleeve, pins passing through said arms, springs on said pins, and a housing to prevent cigar ends from coming in contact with said pins and arms.

ABRAHAM SPINNER.
JOHN S. MERENNA.